United States Patent Office 3,248,734
Patented Apr. 26, 1966

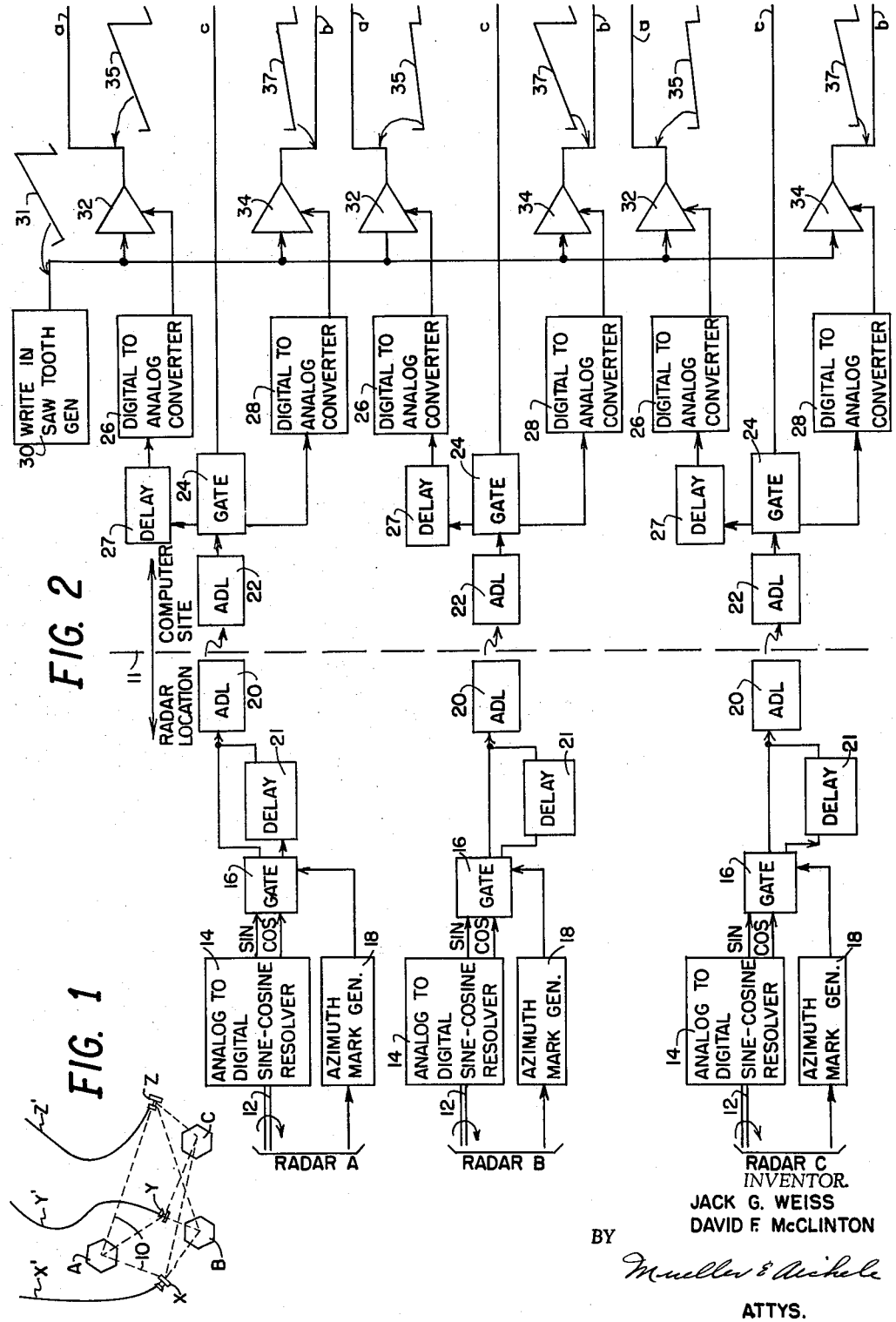

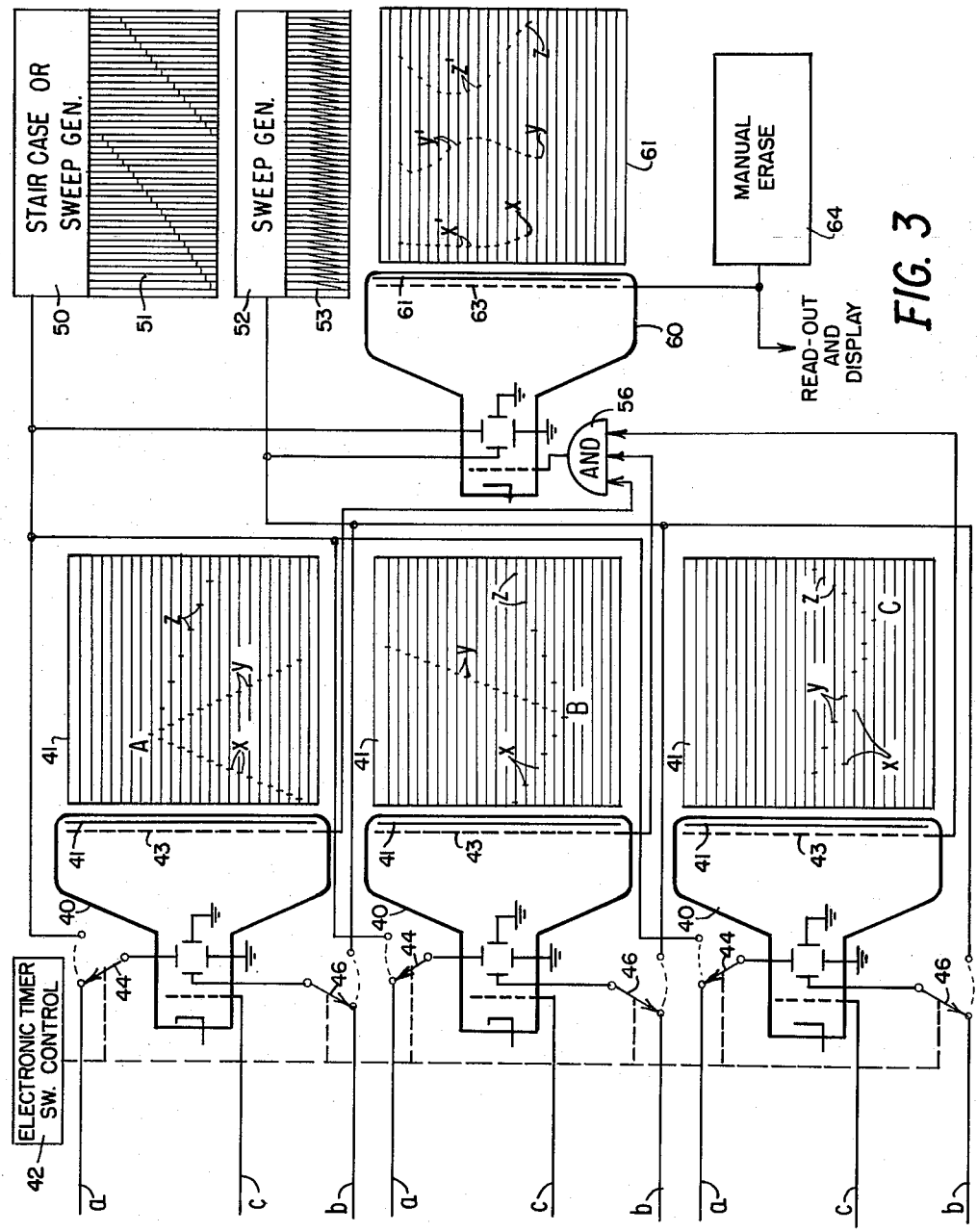

3,248,734
ELECTRONIC TRIANGULATION SYSTEM
Jack G. Weiss, Arlington, and David F. McClinton, Saratoga, Calif., assignors to Motorola, Inc., Chicago, Ill., a corporation of Illinois
Filed Aug. 30, 1963, Ser. No. 305,776
8 Claims. (Cl. 343—112)

This invention relates to electronic plotting systems and more particularly to a system for tracking a plurality of objects by electronic graphical triangulation.

In certain instances an electromagnetic radiation detection system such as a radar complex may be unable to range on an aerial target, and as a result target azimuth is the only information that is readily available. For example, when the target is itself a source of electromagnetic radiation, the range finding circuits of a radar may be effectively jammed. In some instances the target may be a source of infra-red radiation which can be advantageously utilized for azimuth determining purposes. In addition, the target may transmit distress or collision warning signals such that it is desirable to know its past and present bearing. Because of electromagnetic radiation emanating from the target it is possible to passively detects its azimuth or bearing in the absence of range information. Accordingly, the present invention will be applicable to such situations, provided that azimuth or bearing information can be obtained that azimuth or diverse observation points. Such observation points may be two or more remotely positioned azimuth detection points which are oriented on a map in a predetermined manner. And although the invention will be hereinafter described in terms of a radar complex, it may be used in other systems, such as infra-red detection systems, which are capable of producing a series of azimuth marks from a moving source of electromagnetic radiation.

When a large number of targets must be tracked many conventional systems are unable to effectively cope with the excessive quantity of information. Computers programmed to perform mathematical computations and required to handle information from a large number of targets tend to have excessively long data rates, especially when used in conjunction with position-servos to carry out trigonometric computations. And, where a large number of objects must be tracked, ordinary graphical means are often too slow to be of practical value. It is desirable to provide triangulation means with a data rate that is independent of the number of targets so that the system cannot be overloaded by a large number of targets, and capable of displaying the information practically instantaneously.

Accordingly, it is an object of this invention to provide an electronic plotting system for tracking the position of a moving object or a number of moving objects.

Another object of the invention is to provide an automatic electronic plotting system which will produce instantaneous triangulation for tracking a plurality of sources of electromagnetic radiation.

A further object of the invention is to provide an electronic plotting system which is rapid in operation and which will not be saturated by a large number of targets.

A feature of the invention is the provision, in an instantaneous electronic plotting system, of a plurality of storage tubes for storing bearing information of diverse origin for a given target, and of means for automatic readout of the stored information to transfer intersections of the diverse origin bearings of such target for location on map-oriented storage and display means.

Another feature of the invention is the provision, in a system of the above described type, of an additional storage tube to maintain a history of the diverse origin bearing intersections for each of a plurality of targets.

A further feature of the invention is the provision, in the above-described system, of a multiple coincidence gating circuit between the readout circuit of the tubes storing diverse origin bearing information and the input of the target history storage tube to supply information to the target history storage tube only when multiple bearing intersections occur.

Still another feature of the invention is the provision of means for supplying components of target azimuth information signals to the vertical and horizontal deflection plates of a plurality of storage tubes associated with corresponding remotely positioned electromagnetic radiation detection systems to thereby store a plurality of diverse origin azimuth lines on a map-oriented storage area of such tubes for each of a number of targets. Means are provided for automatically scanning the stored azimuth lines for readout, and means responsive to multiple coincidence of the azimuth lines further provide storage of a locus of intersecting points to produce the history of a plurality of targets on a like map-oriented storage area of a display storage device.

Further objects, features, and attending advantages of the invention will become apparent from the following description when considered with the accompanying drawings, in which:

FIG. 1 is a representation of the manner in which a plurality of electromagnetic radiation detectors are oriented to obtain azimuth information for the tracking and display system of the invention; and FIGS. 2 and 3, when taken together, are a block diagram of the tracking and display system of the invention.

In practicing the invention, information signals indicative of the azimuth or bearing of an object or objects are obtained from a plurality of diverse observation points and resolved into components for telemetering to a remote data storage installation. This information is then fed to a corresponding storage tube for each observation point, which storage tube contains deflection means to store the received bearing information as azimuth lines on a map oriented storage area. When all such azimuth lines are entered upon the storage areas of each tube, the information is read out by simultaneous and synchronous scan of the map oriented storage area of each tube.

As a result, a readout signal is produced for each target for each diverse origin azimuth line. The readout system is connected to a multiple coincidence gating circuit which provides an output pulse upon simultaneous receipt of readout signals from all storage tubes as an indication of multiple intersection of the stored diverse origin azimuth lines. This pulse is applied to an additional storage tube, having a like map-oriented storage area, in synchronism with readout of the stored diverse origin azimuth lines. Thus, the multiple azimuth intersections will appear on the storage area of the additional storage tube as the locus of points which give the past history of each target. Momentary triple intersections are indicative of present target position. Subsequent scan of the additional storage tube provides signals of past and present target position for coupling to a display device or to a data store.

Referring now to the drawings, FIG. 1 represents a radar complex having three observation points A, B and C. Each observation point may consist of a radar with its own scanning antenna. Within the range of each radar there are shown targets X, Y and Z. These targets may be aircraft or missiles each following a given course, such as the courses shown at X', Y' and Z', respectively. Each radar obtains a bearing or azimuth line on each target, as represented by dotted lines 10. Bearing information signals are obtained from azimuth resolvers mechanically linked to the radar antennas to provide cosine and sine azimuth components which are oriented with respect to radar antenna position. The resolved sine and cosine components of the azimuth signal are then coded and transmitted by a data link to a remote information center.

The system for obtaining instantaneous triangulation by the electronic plotting of the azimuth information obtained from radars A, B and C are shown in FIGS. 2 and 3. It is to be noted that the entire system is encompassed by both FIGS. 2 and 3 taken together, but which is shown on separate drawings for clarity of illustration. Portions of the system of FIG. 2 shown to the left of dotted line 11, are conveniently located at individual radars A, B and C to provide the sine and cosine azimuth components, while remaining portions of the system shown in FIG. 2 and that portion of the system depicted in FIG. 3 are located at remote plotting information center.

In FIGS. 2 and 3 a three channel system is shown. Each channel functions in the same manner and accordingly like components for each channel are identified by the like reference numerals. It is to be understood that bearing information from two radars could be utilized, but that a three radar system is preferable to minimize false intersections that may occur when a large number of targets are being observed by two radars.

Referring now to FIG. 2, shaft 12 mechanically links the antenna of each of radars A, B and C to a respective sine-cosine azimuth resolver 14. These azimuth resolvers are of a known type and function to convert analog voltages which are indicative of the sine and the cosine of the azimuth of each radar antenna to digital signals in the form of a pulse train. This digital information is fed to sine-cosine transmission gate 16. Enabling signals for gate 16 are provided by azimuth mark generator 18, which generates a pulse as the antenna scans past a target. The input to azimuth mark generator is a video pulse derived from the radar receiver and produced as the antenna scans a source of electromagnetic radiation. A side lobe comparator system may be incorporated with azimuth mark generator 18 to limit the width of the output bearing marker pulse to the main lobe of the scanning antenna.

When gate 16 is enabled the sine and cosine digital representations of the antenna azimuth position are fed to automatic digital data link transmitter 20. The sine information is fed directly to data link transmitter 20 and the cosine information is delayed one word frame by delay lines 21 to provide serialized digital information. Thus, two digital words, one indicative of the sine of the antenna azimuth position, and one indicative of the cosine of the antenna azimuth position are transmitted to automatic digital data link receiver 22. It is to be understood that azimuth resolvers 14, coincidence gates 16, delay lines 21, and automatic data link transmitters 20 are located at respective ones of radars A, B and C. Automatic data link receivers 22, as well as the remaining portions of the system of FIGS. 2 and 3, are located at the plotting information center. Each receiver 22 is selective to azimuth information telemetered from its related transmitter 20.

Each data link receiver 22 obtains azimuth information, resolved into sine and cosine components, and supplies it to coincidence gate 24. Gate 24 channels the received digital sine and cosine azimuth information to digital-to-analog converters 26 and 28, respectively. The digital sine information is delayed by delay line 27 by an amount corresponding to the delay of the cosine information provided by delay line 21 prior to being supplied to digital-to-analog converter 26. The cosine digital information is channeled directly by gate 24 to digital-to-analog converter 28. There is provided at the output of digital-to-analog converter 26 an analog voltage corresponding to the sine of antenna azimuth at the time gate 16 is enabled by azimuth mark generator 18. Similarly there is provided at the output of digital-to-analog converter 28, in time coincidence with the output of digital-to-analog converter 26, an analog voltage corresponding to the cosine of antenna azimuth.

The analog sine and cosine voltages appearing at the output of digital-to-analog converters 26 and 28 are converted to sawtooth voltage waves to provide vertical and horizontal deflection voltages for each of storage tubes 40 (FIG. 3). The peak amplitude of the sawtooth deflection voltage is made proportional to the respective sine and cosine components of the antenna azimuth position so that there is provided on the screen of storage tube 40 the azimuth line of each target scanned by the antennas of radars A, B and C. To this end, write-in sawtooth generator 30 provides a sawtooth voltage of constant amplitude as represented by waveform 31. This sawtooth voltage is coupled to the input of sine (vertical) deflection amplifier 32 and cosine (horizontal) deflection amplifiers 34. The gain of sine deflection amplifier 32 is controlled by the output of sine digital-to-analog converter 26, while the gain of cosine deflection amplifiers 34 is controlled by the output of cosine digital-to-analog converter 28. Accordingly, there is provided at the output of amplifier 32 a sawtooth voltage wave having a peak amplitude proportional to the sine of the azimuth angle of the target detected by each of radars A, B and C, as represented by waveform 35. There is also provided at the output of amplifier 34 a sawtooth voltage having a peak amplitude proportional to the cosine of the azimuth of the target as detected by each of radars A, B and C, as represented by waveform 37. It is to be noted that for each channel the amplitude of the sine and cosine sawtooth voltages differs according to the azimuth angle provided by the associated radar installation, which are oriented differently with respect to a reference azimuth. The D.C. reference level of each sawtooth is adjusted to maintain a fixed reference for the deflection plates of storage tube 40 so that the scan of each tube starts from a position which is map oriented with the relative positions of radars A, B and C. An enabling pulse derived from gate 24 intensifies the control grid potential of the storage tube 40 to provide "write-in" when the target is within the beam width of the scanning antenna for each radar.

Storage tube 40 may conveniently be of the barrier grid type. Such tubes are well-known in the art and include a target or storage area 41 which may be dielectric sheet with a conductive screen mesh backing on one surface thereof and a barrier grid 43 positioned adjacent to the other surface of the dielectric sheet. During the write-in cycle an electron beam is projected through the barrier grid onto the dielectric sheet to produce a localized charge which varies in accordance to a signal applied to the control grid of the storage tube. During the readout cycle the electron beam current varies according to localized charged density of storage area 41 and an electrostatic potential is induced in barrier grid 43, which potential may be coupled to an external high impedance circuit to produce a readout signal. It is to be understood, however, that other types of single gun storage tubes having a write-in cycle and a readout cycle may also be utilized.

Referring now to FIG. 3, it can be seen that in conjunction with FIG. 2 the sine and the cosine sawtooth voltages for the vertical and horizontal deflection plates of storage tube 40 are provided on leads *a* and *b*, respectively, while the grid intensifying signal from gate 24 is supplied to storage tube 40 on lead *c*. When one of targets X, Y and Z (FIG. 1) is within the beam width of the scanning antenna of an associated one of radars A, B and C, the electron beam of storage tube 40 is directed along a path which coincides with the azimuth line of that target. The electron beam therefore writes-in this azimuthe line in the form of a charge pattern on target area 41 of storage tube 40 upon receiving an intensifying pulse from gate 24. Upon completion of a complete 360° scan by the radar antenna, azimuth lines for additional targets within the range of the particular radar installation are written and stored on storage area 41. In this manner a series of lines are drawn extending from radar positions A, B and C on the map-oriented storage area 41 of storage tube 40 along each target azimuth. Thus, azimuth lines X, Y and Z for targets X, Y and Z for each of radars A, B and C are stored as shown in the plane view representation of storage area 41 for each storage tube 40. As previously mentioned, a D.C. reference is provided for the deflection plates of each storage tube 40 so that beam deflection starts from a point corresponding to the map-orientation of each radar installation A, B and C. Thus, in the plane view representation of storage area 41 for each storage tube 40 azimuth lines X, Y and Z extend in different directions from different points of references A, B and C. The location, at write-in, for the azimuth lines stored on storage area 41 is determined by the relative amplitudes of the vertical and horizontal sawtooth voltages applied to each of storage tubes 40.

Transition from write-in to read-out for the information stored in each storage tube 40 is achieved by mechanically ganged switch sections 44 and 46, controlled by an electronic timer 42. Switch section 44 is operable to alternately connect the vertical deflection plates of storage tube 40 between the amplified output of sine digital-to-analog converter 26 and the output of the vertical stair-step generator 50. Switch section 46 is operable to connect the horizontal deflection plates of storage tube 40 between the amplified output of cosine digital-to-analog converter 28 and the output of horizontal sweep generator 52. Electronic timer 42 thus periodically switches storage tube 40 between write in and readout at a convenient rate, which rate may be set at multiples of the lowest radar scan rate to insure that there is detection of all targets. In instance of intermittent operation of the radar, or blind spots, the switching rate may be varied so that write-in of azimuth lines without readout may be continued for as long periods as in necessary to insure detection of all targets.

During readout stair-case generator 50 and sweep generator 52 provide the necessary deflection voltages for scan of the azimuth lines stored on target area 41 of storage tubes 40. Staircase generator 50 and sweep generator 52 are synchronized so that with each voltage step applied to the vertical deflection plates of storage tube 40 there is a horizontal sweep of target area 41, as illustrated by waveforms 51 and 53. As the electron beam passes over the target azimuth lines X, Y and Z on storage area 41 of storage tube 40, output pulses are derived from barrier grids 43 and coupled to triple coincidence or three input AND gate 56. Synchronously with readout scan of storage tubes 40 vertical and horizontal deflection voltages are appled to storage tube 60 by staircase generator 50 and sweep generator 52. Triple coincidence of readout pulses derived from storage tube 40 provide a single output pulse from AND gate 56 to provide write-in of a single point on storage area 61 of display tube 60. Since the azimuth lines of each storage tube 40 are scanned simultaneously and in synchronism, coincidence at the input of AND gate 56 will occur only at the time of triple intersection of the azimuth lines, which intersection locates targets X, Y and Z in a rectangular coordinate system at that instance in time. The concurrent output of AND gate 56 intensifies the control grid of storage tube 60 for write-in of the position of the target having azimuth lines which intersect on map oriented storage area 61. Therefore, for each readout scan of storage tubes 40 each target is displayed as a dot or point locating its position in a rectangular coordinate system on storage area 61 of display tube 60. On successive readout scans a new target position will be stored to give a locus of points X', Y' and Z' to provide a history of targets X, Y, and Z. This target history is depicted in the plane view representation of storage area 61 of display tube 60, and represents a series of triangulations of the azimuth of target X, Y and Z as provided by radars A, B and C on successive scans.

Storage tube 60 may be a barrier grid type as used for storage tubes 40, or may be of the type having a long persistance photosensitive screen or storage area for direct visual display. When provided with a readout scanning cycle at the lowest scanning rate of the radar antenna the position of all targets is determined by a single scan. Thus, for example, with antenna rotation of 6 r.p.m. it is possible to provide target position information every 10 seconds to the data processing or display system of the target information center.

Direct readout of storage tube 60 may be provided by connecting the vertical and horizontal deflection plates of storage tube 60 to means for providing a readout scanning cycle, and the output signals thereby derived applied to a display device or to a data store for the target information center. A manual erase 64 may also be provided for storage tube 60 for use when the display becomes so cluttered with target locii that sorting becomes a problem. This may be accomplished, for example, by applying a potential to barrier grid 63 which effectively cancels the localized charge on storage area 61. Momentary triple intersections will still be identified since they have no past history. The particular type of readout for storage tube 60 is determined by a specific application, taking into consideration the type of computer and data storage available at the target information center. It is possible, for example, to provide a "track stick" which positions a marker over the target positions as shown on a display device associated with readout of storage tube 60, and a button to be depressed to unlock a gate and enter target storage into the radar data store.

With reference to FIG. 1 it can be seen that for each of targets X, Y and Z there is an intersection at the target of the azimuth lines extending from each of radars A, B and C to a given target at a given instant in time. The azimuth lines for each target, as determined for example by a complete 360° azimuth scan of radar A, is stored on storage area 41 of a corresponding storage tube 40 during write-in. It is to be noted that the azimuth lines stored on the storage area are spatially oriented with reference to the map location of radar A. In a like manner azimuth lines for each target are also stored on corresponding storage tubes 40 for radars B and C, map-oriented with respect to the locations of radars B and C respectively. During subsequent readout an output signal is produced by each storage tube 40 as the stored azimuth lines are scanned. Triple coincidence of these output signals locate the targets at that time to provide a point in the target path or trajectory for storage on storage area 61 of storage tube 60. Successive scanning of readout of storage tubes 40 provides a series of points which plot the course of targets X, Y and Z on storage area 61 of storage tube 60, with the most recently storage point indicative of the present target position. Readout storage tube 60 provides signals representative of both the past history and the present location of the targets. Thus, as shown in FIG. 3 the series of points plotted on storage area 61 of storage tube 60 coincides with the path or trajectory X', Y' and Z' of the moving targets is illustrated in FIG. 1.

The invention provides therefore an instantaneous automatic target azimuth or bearing plotting system for providing information as to the past and present course of a moving source of electromagnetic radiation which may be passively detected. The system provides instantaneous triangulation to allow simultaneous tracking of a large number of targets, is immune to false indications, and will not be saturated or overloaded by the presence of a large number of targets. The information thereby provided is immediately available to be supplied to data processing or storage systems of an information center as needed.

We claim:

1. An electronic triangulation system for plotting the position of one or more moving targets including in combination, means for providing signals indicative of the azimuth of each said target from a plurality of diverse locations, information storage means including an azimuth storage tube for each said diverse location, means for supplying said azimuth signals to said storage means for storing an azimuth line for each said target on a map oriented storage area of each said tube, means for periodically scanning the storage area of each said storage tube to provide pulses in response to said stored azimuth lines, means responsive to coincidence of said pulses to provide a coincidence signal, and further information storage means including a storage tube having a map oriented storage area for storing said coincidence signals, with said stored coincidence signals indicative of the position of said targets on said map oriented storage area.

2. An electronic triangulation system for plotting the position of one or more sources of electromagnetic radiation including in combination, means providing signals indicative of the azimuth of each said radiation sources from a plurality of diverse locations, first information storage means including an azimuth storage tube having a map oriented storage area for each said diverse location, means supplying said azimuth signals to said storage means, said azimuth signals being stored as azimuth lines for each said radiation source on the storage area of said azimuth storage tube, means for periodically scanning the storage area of each azimuth storage tube to provide pulses in response to scan of each said azimuth line, coincidence circuit means having an input coupled with each azimuth storage tube to provide an output signal upon coincidence of said pulses obtained from each azimuth storage tube, second information storage means including a storage tube having a map oriented storage area, and means coupling the output of said coincidence circuit means to said storage tube of said second information storage means, with the output of said coincidence circuit means being stored as an indication of the position of said electromagnetic radiation sources.

3. An electronic triangulation system for plotting the position of one or more moving sources of electromagnetic radiation including in combination, means providing signals indicative of the azimuth of each said radiation sources from a plurality of diverse locations, with each said location having means for detecting the azimuth of said radiation source, first information circuit means having an azimuth storage tube with a map oriented storage area for each said diverse location, means for periodically switching each said azimuth storage tube to scanning means for alternately providing a write-in cycle and a readout cycle, means for supplying azimuth signals derived from said radiation sources to said periodic switching means for providing write-in of azimuth lines on a map oriented storage area of a related one of said azimuth storage tubes, means coupled with said periodic switching means to provide simultaneous scanning of the storage area of each said azimuth storage tube to produce a readout pulse responsive to said stored azimuth lines, a multiple coincidence circuit having inputs coupled with each said storage tube to provide an output signal in response to coincidence of said readout pulses, second information storage means including a storage tube having a map oriented storage area, and means coupling the output of said coincidence circuit means to the storage tube of said second information circuit means, with the output of said coincidence means being stored to provide an indication of the past and present path of said electromagnetic radiation source.

4. An electronic triangulation system for plotting the position of one or more moving objects which are the source of detectable electromagnetic radiation, the combination including, first information storage means including first, second and third storage tubes, each said storage tube having a storage area for storing received bearing information signals from respective observation points as an azimuth line thereon, each said line being oriented on said storage area in relation to said observation point, a fourth storage tube having a storage area, means for periodically switching said first, second and third storage tubes between writein and readout scanning means, with readout scanning means for said first, second and third storage tubes further providing write-in scan for said fourth storage tube, a triple coincidence gating circuit having a plurality of input terminals each connected to one of said first and second and third storage tubes, with readout scan of said stored azimuth line providing input signals for said coincidence circuit means, and means coupling the output of said coincidence circuit means to said fourth storage tube, with the output pulses of said coincidence circuit means being stored on a map oriented storage area of said fourth storage tube as an indication of the path of said moving objects.

5. An electronic triangulation system adapted to plot the course of a plurality of moving sources of electromagnetic radiation by utilizing bearing information signals supplied by three diversely located observation points, said system including in combination, first, second and third storage tubes each having an identical map oriented storage area adapted to store bearing information as lines extending from a reference point, means for periodically switching each said storage tube between write-in and readout scanning means, write-in means for supplying bearing information signals from an associated observation point to said first, second and third storage tubes to store azimuth lines on said storage area during write-in scan, readout means for deriving an output pulse from each of said azimuth line storage tubes when the electron beam thereof scans said stored azimuth lines during said readout scan, triple coincidence circuit means coupled with said readout means to receive output pulses therefrom, and a fourth storage tube coupled with said triple coincidence circuit means, said fourth storage tube having scanning means connected thereto to provide write-in scan in synchronization with the readout scan of said first, second and third storage tubes, thereby causing said fourth storage tube to plot the locus of points of intersections of respective bearings of said moving radiation sources, with said points representing the past course and present position of said sources, whereby successive ones of such points will remain on the screen of said fourth storage tube to indicate the path of the respective sources of electromagnetic radiation.

6. An electronic triangulation system adapted to plot the path of a plurality of sources of electromagnetic radiation by utilizing azimuth information signals supplied by three diversely located observation points, said system including in combination, first, second and third storage tubes each having an identical map oriented storage area adapted to store azimuth information from an associated observation point as lines on the storage areas thereof, write-in means supplying said azimuth information signals to said first, second and third storage tubes, readout means for deriving an output pulse from each of said tubes when the electron beams thereof scans the stored azimuth lines, a staircase signal generator and a sweep signal generator, switch means for periodically connecting said staircase generator and said sweep generator to said storage tubes to simultaneously cause the electron beam of said first, second and third storage tubes to scan said stored azimuth lines, a triple coincidence circuit having inputs connected to said readout means to receive pulses therefrom, and a fourth storage tube connected to said staircase generator and sweep generator to thereby cause scan of its storage area synchronously with readout scan of said first and second and third storage tubes, with said triple coincidence circuit having an output connected to said fourth storage tube to apply a write-in pulse thereto upon coincidence of readout pulses derived from said readout means of said first, second and third storage tubes, and with said fourth storage tube storing points indicative of triple intersection of respective azimuth lines for said radiation sources, whereby successive ones of such points will remain on the storage area of said fourth storage tube to indicate the past and present position of respective sources of electromagnetic radiation.

7. An electronic triangulation system for plotting the position of one or more moving sources of electromagnetic radiation, said system including in combination, a plurality of diversely located electromagnetic radiation detecting means for obtaining signals indicative of the azimuth of each said radiation source, first information storage means including first, second and third azimuth storage tubes each having a map oriented storage area for an associated one of said diversely located radiation detection means, means for transmitting said azimuth signals obtained by respective ones of said radiation detection means to its associated azimuth storage tube, means for alternately providing write-in scan and readout scan of said azimuth storage tubes, with said azimuth signals being stored as azimuth lines for each radiation source on the storage area of said azimuth storage tubes, means for deriving readout signals in response to readout scan of the azimuth line stored on each said azimuth storage tube, coincidence circuit means having inputs coupled to said azimuth storage tubes to receive readout signals therefrom during readout scan, said coincidence circuit means providing an output pulse upon coincidence of readout signals derived from said azimuth storage tubes, second information storage means including a further storage tube coupled to the output of said coincidence circuit means, and means providing writein scan of said further storage tube synchronously with readout scan of said azimuth storage tubes, with output pulses of said coincidence circuit means being stored as points on the locus of the path of said moving electromagnetic radiation sources.

8. An electronic triangulation system for plotting the position of one or more moving sources of electromagnetic radiation, said system including in combination, first, second and third diversely located electromagnetic detection means for obtaining signals indicative of the azimuth of each said radiation sources, first information storage means including first, second and third storage tubes each having a map oriented storage area for an associated one of each diversely located radiation detection means, means for transmitting said azimuth signals obtained by respective ones of said detection means to its associated azimuth storage tube, means for alternately providing write-in scan and readout scan of said azimuth storage tubes, with said azimuth signal being stored as azimuth lines for each radiation source on the storage area of associated ones of each of said first, second and third storage tubes, means for deriving readout signals in response to readout scan of the azimuth lines stored on each of said first, second and third storage tubes, coincidence circuit means having an input coupled to each of said first, second and third storage tubes to receive readout signals therefrom during readout scan, with said coincidence circuit means providing an output pulse upon coincidence of readout from said first, second and third storage tubes, a fourth storage tube coupled with the output of said coincidence circuit means, and means providing write-in scan of said fourth storage tube in synchronism with readout scan of said first and second and third storage tubes, with the output pulse of said coincidence circuit means being stored as a point on the locus of the path of said moving electromagnetic radiation sources.

References Cited by the Examiner

UNITED STATES PATENTS

| | | | |
|---|---|---|---|
| 2,684,474 | 7/1954 | Kass | 343—112 X |
| 2,864,081 | 12/1958 | Steelman | 343—112 |
| 3,015,098 | 12/1961 | Jolliffe et al. | 343—112 |

CHESTER L. JUSTUS, *Primary Examiner.*